United States Patent
Seo (10) Patent No.: US 11,074,846 B2
(45) Date of Patent: Jul. 27, 2021

(54) DISPLAY DEVICE

(71) Applicant: Samsung Display Co., Ltd., Yongin-si (KR)

(72) Inventor: Hae-Kwan Seo, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/918,516

(22) Filed: Jul. 1, 2020

(65) Prior Publication Data
US 2021/0056879 A1   Feb. 25, 2021

(30) Foreign Application Priority Data
Aug. 20, 2019   (KR) .................. 10-2019-0101454

(51) Int. Cl.
*G09G 3/20*   (2006.01)
*G09F 9/30*   (2006.01)
*G06F 1/18*   (2006.01)

(52) U.S. Cl.
CPC .............. *G09G 3/20* (2013.01); *G06F 1/189* (2013.01); *G09F 9/301* (2013.01); *G09G 2300/0426* (2013.01); *G09G 2380/02* (2013.01)

(58) Field of Classification Search
CPC ............. G09G 3/20; G09G 2300/0429; G09G 2380/02; G06F 1/189; G06F 1/1626; G06F 1/1658; G09F 9/301
See application file for complete search history.

(56) References Cited

U.S. PATENT DOCUMENTS

| | | | |
|---|---|---|---|
| 2008/0001892 A1* | 1/2008 | Kim | G02F 1/13458 345/97 |
| 2014/0077364 A1* | 3/2014 | Marimuthu | H01L 24/02 257/737 |
| 2016/0232838 A1* | 8/2016 | Seo | G09G 3/20 |
| 2016/0338202 A1* | 11/2016 | Park | H01L 24/00 |
| 2017/0103951 A1* | 4/2017 | Lee | H01L 23/295 |
| 2017/0287853 A1* | 10/2017 | Kim | H01L 23/49822 |
| 2019/0164893 A1* | 5/2019 | Kim | H01L 24/20 |
| 2019/0189549 A1* | 6/2019 | Jo | H01L 23/49827 |

FOREIGN PATENT DOCUMENTS

| | | | | |
|---|---|---|---|---|
| KR | 10-2013-0110543 A | | 10/2013 | |
| KR | 20190003199 A | * | 1/2019 | ........... G02F 1/1345 |

* cited by examiner

*Primary Examiner* — Joe H Cheng
(74) *Attorney, Agent, or Firm* — Lewis Roca Rothgerber Christie LLP (57) ABSTRACT

A display device includes: a display panel including a display area and a pad area having a pad; and a complex circuit package on the pad, including: a first driving signal structure including a first penetration electrode vertically penetrating an inside of the first driving signal structure; a second driving signal structure on the first driving signal structure; and a redistribution wiring structure surrounding the second driving signal structure, and the redistribution wiring structure electrically connecting the first driving signal structure and the second driving signal structure.

18 Claims, 6 Drawing Sheets

DISPLAY DEVICE

CROSS-REFERENCE TO RELATED APPLICATION

The present application claims priority to and the benefit of Korean Patent Application No. 10-2019-0101454, filed on Aug. 20, 2019 in the Korean Intellectual Property Office (KIPO), the content of which is incorporated herein in its entirety by reference.

BACKGROUND

1. Field

Aspects of some example embodiments relate generally to a display device.

2. Description of the Related Art

Generally, a display device includes a display panel and a driving unit. The display panel may include a display area and a pad area, and a plurality of pixels in the display area. A plurality of pads may be located in the pad area. A driving unit may be electrically connected to the pads, and may include a driving signal structure or circuit (e.g., a display driver IC chip), a flexible printed circuit board ("FPCB"), a printed circuit board ("PCB"), and the like. A signal (e.g., a signal for driving pixels) generated from an external device is applied to the driving signal structure through the FPCB (or the PCB) to display images (e.g., static or video images), and the driving signal structure may provide the signal to the pixels. Resistors, capacitors, connectors, and the like may be mounted on the FPCB. The FPCB may be classified into a chip-on-glass, a chip-on-plastic, a chip-on-film, and the like depending on a location where the driving signal structure is located. As the chip-on-film includes the driving signal structure, the display device may include the pad area having a relatively reduced area than the chip-on-plastic and the chip-on-glass. That is, a dead space of the display device may be reduced.

Although a display device may include the FPCB of the chip-on-film, the display device may have a relatively large dead space due to a space utilized to bend the FPCB. In addition, when the display device further includes additional driving signal structures or components (e.g., a touch IC chip, a power management IC chip, etc), the dead space may be further increased because the display device may further include an additional FPCB. In addition, the signal may be transmitted to the driving signal structure through the FPCB, such that a signal transmission time of the display device is delayed.

The above information disclosed in this Background section is only for enhancement of understanding of the background and therefore the information discussed in this Background section does not necessarily constitute prior art.

SUMMARY

Aspects of some example embodiments relate generally to a display device. For example, aspects of some example embodiments relate to the display device including a complex circuit package.

Aspects of some example embodiments include a display device.

According to some example embodiments, a display device may include a display panel including a display area and a pad area having a pad, and a complex circuit package on the pad. The complex circuit package may include a first driving signal structure including a first penetration electrode vertically penetrating an inside of the first driving signal structure, a second driving signal structure on the first driving signal structure, and a redistribution wiring structure surrounding the second driving signal structure. The redistribution wiring structure may electrically connect the first driving signal structure and the second driving signal structure.

According to some example embodiments, the first driving signal structure may further include a first bump between the first penetration electrode and the redistribution wiring structure, and a second bump between the first penetration electrode and the pad.

According to some example embodiments, the first penetration electrode may electrically connect the first bump and the second bump.

According to some example embodiments, the display device may further include an adhesion member between the first bump and the redistribution wiring structure.

According to some example embodiments, the redistribution wiring structure may further include a circuit layer on a same layer as the second driving signal structure, a first wiring layer between the circuit layer and the first driving signal structure, a second wiring layer on the second driving signal structure and the circuit layer, and a connector on the second wiring layer.

According to some example embodiments, the redistribution wiring structure may further include a third wiring layer between the connector and the second wiring layer, and a second penetration electrode between the second wiring layer and the third wiring layer. The second penetration electrode may vertically penetrate an inside of the redistribution wiring structure.

According to some example embodiments, an external device may generate a first driving signal and a second driving signal, the first driving signal may be applied to the pad passing through the first driving signal structure via the redistribution wiring structure, and the second driving signal may be applied to the pad passing through the second driving signal structure and the first penetration electrode via the redistribution wiring structure.

According to some example embodiments, the display device may further include a sensing structure on the display panel.

According to some example embodiments, an external device may generate a sensing signal, and the sensing signal may be applied to the sensing structure passing through the second driving signal structure and the first penetration electrode via the redistribution wiring structure.

According to some example embodiments, the display panel may further include a bending area, and the complex circuit package may be on a rear surface of the display panel when the bending area is bent.

According to some example embodiments, a display device may include a display panel including a display area and a pad area having a pad, a plurality of complex circuit packages on the pad of the display panel, and a plurality of conductive films electrically connect the plurality of complex circuit packages. Each of the complex circuit packages may include a first driving signal structure including a first penetration electrode vertically penetrating an inside of the first driving signal structure, and a redistribution wiring structure on the first driving signal structure. The redistribution wiring structure may electrically connect the first driving signal structure and the conductive films.

According to some example embodiments, each of the conductive films may electrically connect two adjacent complex circuit packages of the complex circuit packages.

According to some example embodiments, the first driving signal structure may further include a first bump between the first penetration electrode and the redistribution wiring structure, and a second bump between the first penetration electrode and the pad.

According to some example embodiments, the first penetration electrode may electrically connect the first bump and the second bump.

According to some example embodiments, the display device may further include an adhesion member between the first bump and the redistribution wiring structure.

According to some example embodiments, the redistribution wiring structure may further include a redistribution wiring layer on the first driving signal structure, a first connector in a first portion on the redistribution wiring layer, receiving a signal, and transmitting the signal to the redistribution wiring layer, and a second connector in a second portion on the redistribution wiring layer, and receiving the signal from the redistribution wiring layer.

According to some example embodiments, the display device may further include a sensing structure on the display panel.

According to some example embodiments, the display panel may further include a bending area, and the complex circuit packages may be on a rear surface of the display panel when the bending area is bent.

Therefore, a display device according to some example embodiments may include a display panel and a complex circuit package. The display panel may include a display area and a pad area having a pad. The complex circuit package on the pad may include a first driving signal structure including a first penetration electrode vertically penetrating an inside of the first driving signal structure, a second driving signal structure on the first driving signal structure, and a redistribution wiring structure surrounding the second driving signal structure. The redistribution wiring structure may electrically connect the first driving signal structure and the second driving signal structure. The display device may have a structure in which the second driving signal structure and the redistribution structure are on the first driving signal structure. The complex circuit package may be vertically stacked, so that a dead space of the display device is reduced and a signal transmission time is shortened. In addition, a process of mounting a driving unit on the display device may be simplified, and a signal loss may be reduced.

Therefore, a display device according to some example embodiments may include a display panel, a plurality of complex circuit packages, and a plurality of conductive films. Each of the complex circuit packages may include a first driving signal structure and a redistribution wiring structure on the first driving signal structure, and the conductive films may electrically connect the complex circuit packages. The display device may include the complex circuit package having a vertically stacked structure, and conductive films electrically connecting the complex circuit packages, so that all of the first driving signal structures are electrically connected to an external device with a minimum area.

BRIEF DESCRIPTION OF THE DRAWINGS

Illustrative, non-limiting example embodiments will be more clearly understood from the following detailed description in conjunction with the accompanying drawings.

DETAILED DESCRIPTION

Hereinafter, aspects of some example embodiments of the present inventive concept will be explained in more detail with reference to the accompanying drawings.

Figure 1:
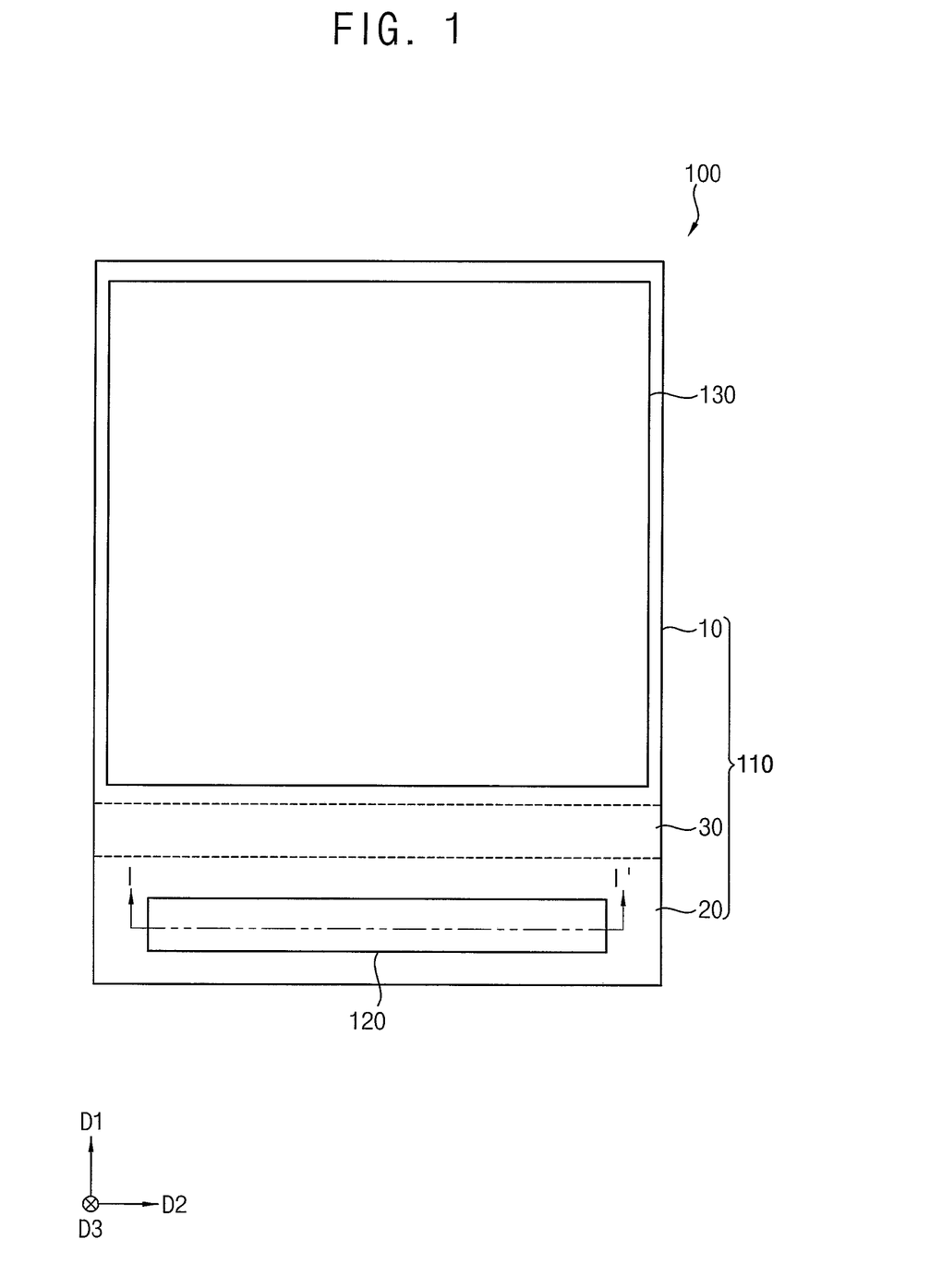
FIG. 1 is a plan view illustrating a display device according to some example embodiments.
Figure 2:
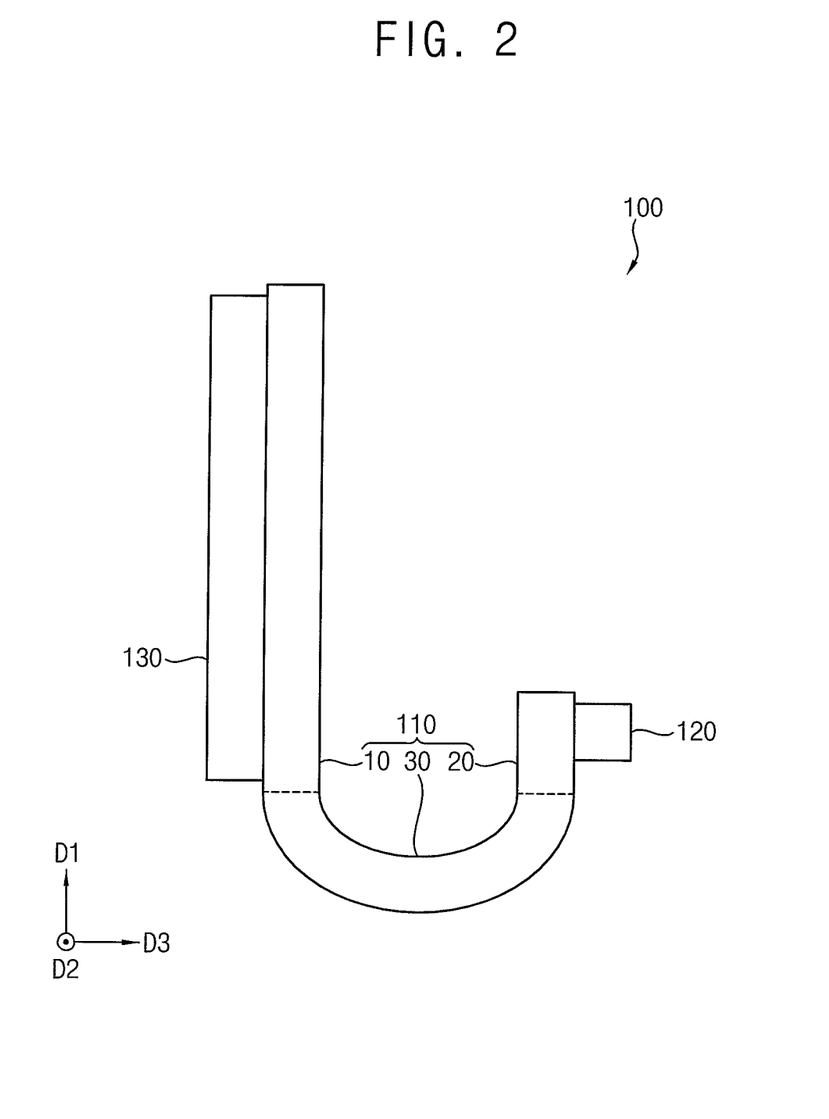
FIG. 2 is a side view illustrating the display device of FIG. 1.
Figure 3:
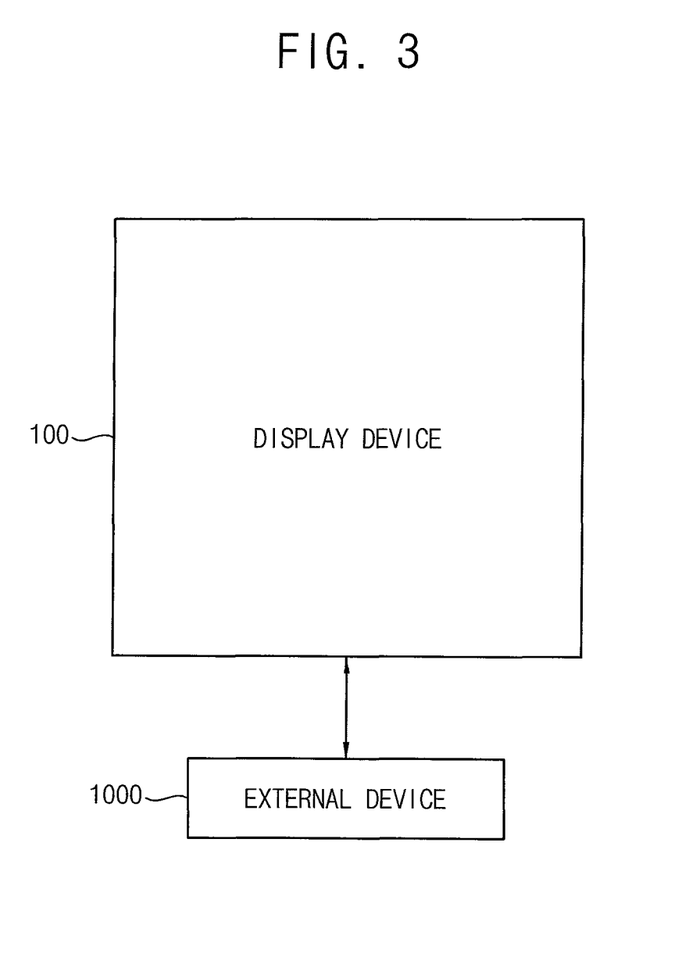
FIG. 3 is a block diagram for describing an external device electrically connected to the display device of FIG. 1.

FIG. 1 is a plan view illustrating a display device according to some example embodiments, FIG. 2 is a side view illustrating the display device of FIG. 1, and FIG. 3 is a block diagram for describing an external device electrically connected to the display device of FIG. 1.

Referring to FIGS. 1, 2, and 3, the display device 100 may include a display panel 110 (e.g., including a display area 10, a pad area 20, and a bending area 30), a complex circuit package 120, and a sensing structure 130. The display panel 110 may include a display area 10, a pad area 20 and a bending area 30. A plurality of pixels may be located in the display area 10 of the display panel 110, and the display device 100 may display images on the display area 10 using the pixels. For example, the display area 10 may have a rectangular shape having a long side in a first direction D1 and a short side in a second direction D2 that is perpendicular to the first direction D1, but a shape of the display area 10 is not limited thereto. The shape of the display area 10 may have any suitable shape according to the design of the display device 100.

A plurality of pads (for example, a pad PD illustrated below in FIG. 4) may be located in the pad area 20 of the display panel 110. According to some example embodiments, each of the pads may have a width (e.g., a set or predetermined width) along the second direction D2 on a plane, and each of the pads may be arranged at regular intervals along the second direction D2. The pads may be electrically connected to an external device 1000. Therefore, a signal generated from the external device 1000 may be provided to the display device 100 passing through the pads. For example, the signal generated from the external device 1000 may be provided to the display panel 110 and/or the sensing structure 130 passing through the pads.

The bending area 30 of the display panel 110 may be bent. As shown in FIG. 2, when the bending area 30 having a bending axis extending in the second direction D2 in the lower portion of the display panel 110 is bent, the display area 10 may face the pad area 20 to each other. Accordingly, the complex circuit package 120 may be located on a rear surface of the display panel 110. However, in other example embodiments, the display device 100 may not include a bending area, or may include a plurality of bending areas having a bending axis extending in a direction other than the second direction D2.

The complex circuit package 120 may be located on the pad area 20 of the display panel 110. For example, the complex circuit package 120 may be located on the pad in the pad area 20, and may be electrically connected to the pad. According to some example embodiments, the complex circuit package 120 may be arranged to extend along the second direction D2. Meanwhile, although the complex circuit package 120 is illustrated as being located in a lower portion of the display panel 110 in FIG. 1, a configuration of structure according to embodiments of the present invention is not limited thereto. For example, the pad area 20 may be located on upper and lower portions of the display panel 110, or may be located in corner portions of the display panel 110. In this case, the complex circuit package 120 may be located in upper and lower portions of the display panel 110, or may be located on corner portions of the display panel 110.

One or more complex circuit packages 120 may be utilized according to various embodiments. The display device 100 may be a small electronic device (for example, a smartphone), or may be a medium/large electronic device (for example, a tablet PC or a television). For example, when the display device 100 is a relatively small electronic device, one complex circuit package may be utilized. Otherwise, when the display device 100 is a relatively medium or large electronic device, a plurality of the complex circuit packages may be utilized. However, a configuration of embodiments according to the present invention is not limited thereto. The complex circuit package 120 will be described in more detail with reference to FIG. 4.

The sensing structure 130 may sense a touch or an approach of a user using a plurality of sensing electrodes. The sensing structure 130 may be located on the display panel 110. For example, the sensing structure 130 may be arranged at the display area 10 of the display panel 110. A structure in which the sensing structure 130 is located on the display panel 110 may include various structures. According to some example embodiments, the sensing structure 130 may be an external structure that is separated from and located on the display panel 110. According to some example embodiments, the sensing structure 130 may be an embedded structure in which some components (e.g., sensing electrodes) of the sensing structure 130 are overlapped with and mounted on some components (e.g., a thin film encapsulation layer) of the display panel 110.

Meanwhile, the sensing structure 130 may include the plurality of sensing electrodes for sensing the touch or the approach of the user or an external object (e.g., a user's finger or a stylus). The sensing electrodes may be formed in a single layer or multiple layers. When the sensing structure 130 senses the touch input (e.g., from a user), a changed capacitance may be generated between the sensing electrodes. The external device 1000 may generate a sensing signal to detect the changed capacitance. In addition, the display device 100 may detect a touch input of the user (e.g., from the user's finger or other object, such as a stylus) and a position of the user (or external object) through the changed capacitance.

Figure 4:
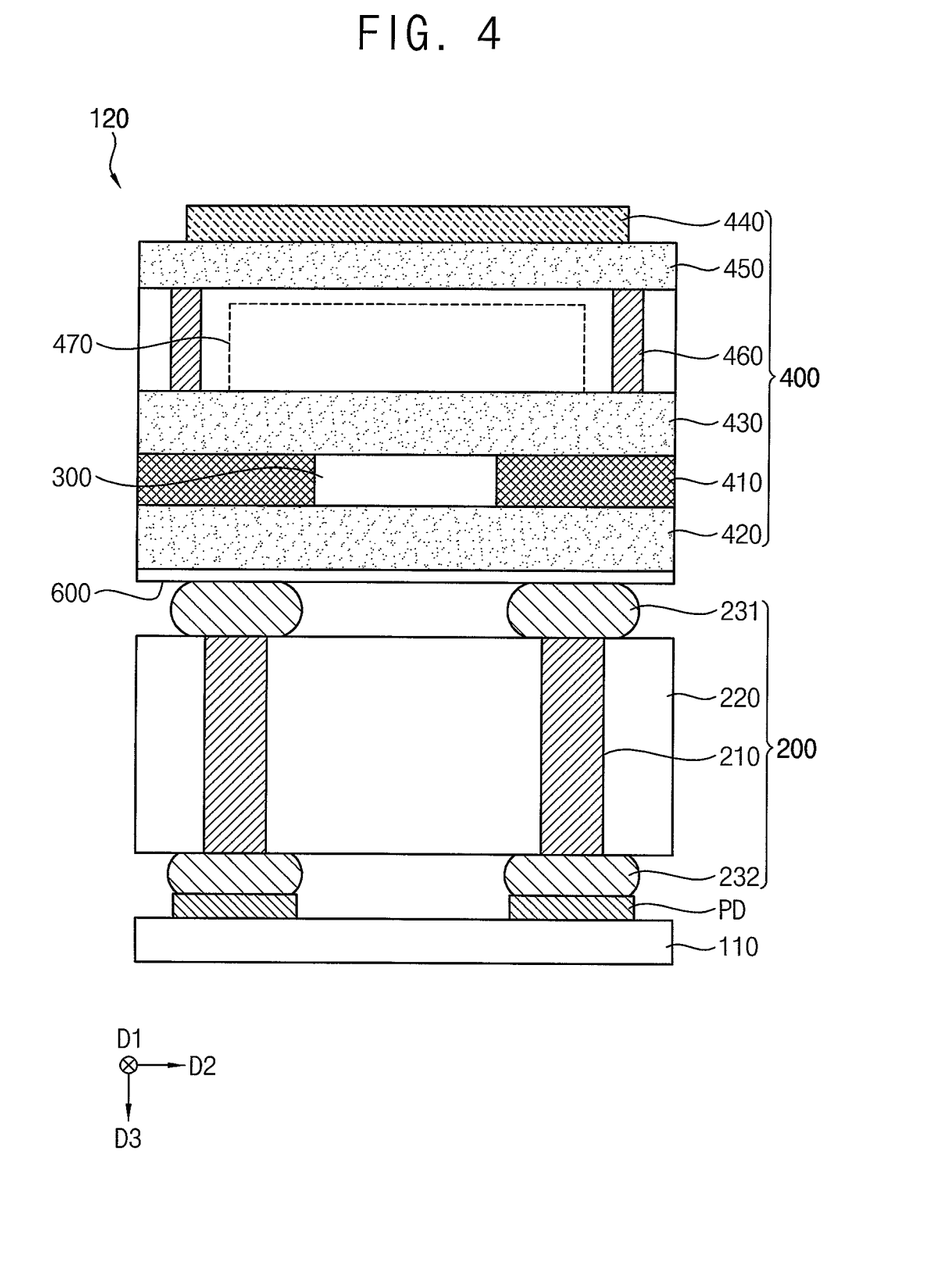
FIG. 4 is a cross-sectional view taken along the line I-I' of FIG. 1.

FIG. 4 is a cross-sectional view taken along the line I-I' of FIG. 1.

Referring to FIGS. 1 and 4, the complex circuit package 120 may be located on the pad area 20 of the display panel 110. The complex circuit package 120 may include a first driving signal structure 200, a second driving signal structure 300, and a redistribution wiring structure 400.

When a driving signal structure (e.g., a display driver IC chip) for driving a display panel and a flexible printed circuit board ("FPCB") are located in a display device, the FPCB may have a curved shape such that the FPCB is bent in order to electrically connect the external device 1000 and the driving signal structure. The bent portion of the FPCB may be defined as a dead space. In addition, a signal generated from the external device 1000 may be applied to the driving signal structure through the FPCB, such that a signal transmission time of the display device may be delayed.

On the other hand, the display device 100, according to some example embodiments, may include the complex circuit package 120 in which the redistribution structure 400 is vertically stacked on the first driving signal structure 200, so that utilization of an extra FPCB may be avoided. Accordingly, the dead space of the display device 100 may be reduced, and the signal transmission time may be shortened.

In this case, the complex circuit package 120 may have a vertically (for example, in a direction opposite to the third direction D3) stacked structure. In other words, the first driving signal structure 200 may be located on the pad PD in the pad area 20, and the second driving signal structure 300 may be located on the first driving signal structure 200. The redistribution wiring structure 400 may surround the second driving signal structure 300.

In addition, as the complex circuit package 120 may have a vertically stacked structure, the complex circuit package 120 may electrically connect the display device 100 and the external device 1000. For example, the complex circuit package 120 may electrically connect the display device 100 and the external device 1000, using a first penetration electrode 210 and bumps 231 and 232 included in the first driving signal structure 200, and the redistribution wiring structure 400.

Hereinafter, components included in the complex circuit package 120 will be described in more detail.

The redistribution wiring structure 400 may include a circuit layer 410, a first wiring layer 420, a second wiring layer 430, connector 440, a third wiring layer 450, and a second penetration electrode 460.

The circuit layer 410 may electrically connect the second driving signal structure 300, the first wiring layer 420, and the second wiring layer 430. According to some example embodiments, the circuit layer 410 may be located on a same layer as the second driving signal structure 300, and wires for transmitting signals may be formed inside of the circuit layer 410. That is, the wires may be formed together with the second driving signal structure 300. For example, the second driving signal structure 300 and the circuit layer 410 may be formed through a panel-level-package ("PLP") process.

The first wiring layer 420 may be located between the circuit layer 410 and the first driving signal structure 200, and the second wiring layer 430 may be located on the second driving signal structure 300 and the circuit layer 410.

Each of the first and second wiring layers 420 and 430 may transmit a signal generated from the external device 1000 to the first driving signal structure 200 or the second driving signal structure 300. In addition, each of the first and second wiring layers 420 and 430 may receive a signal from the display device 100, and may transmit the signal to the external device 1000. That is, the redistribution wiring structure 400 may electrically connect the display device 100 and the external device 1000, and may transmit signals in both directions. According to some example embodiments, each of the first and second wiring layers 420 and 430 may be formed in multiple layers in order to properly transmit a signal. For example, a metal layer on which the wiring pattern is formed and an insulating layer may be alternately arranged in each of the first and second wiring layers 420 and 430.

The connector 440 may be electrically connected to the second wiring layer 430. The connector 440 may receive a signal generated from the external device 1000, and may transmit the signal to the second wiring layer 430.

Meanwhile, according to some example embodiments, a passive element 470 such as resistors, capacitors, and the like may be mounted on the redistribution wiring structure 400, and the redistribution wiring structure 400 may further include the third wiring layer 450 and the second penetration electrode 460. The third wiring layer 450 may be located between the second wiring layer 430 and the connector 440. The second penetration electrode 460 may be located between the second wiring layer 430 and the third wiring layer 450, and may vertically penetrate an inside of the redistribution wiring structure 400. The third wiring layer 450 and the second penetration electrode 460 may be electrically connected to the connector 440 and the second wiring layer 430. In other words, the third wiring layer 450 may receive the signal generated from the external device 1000 through the connector 440, and may transmit the signal to the second penetration electrode 460. The second penetration electrode 460 may transmit the signal to the second wiring layer 430. In addition, the third wiring layer 450 and the second penetration electrode 460 may receive a signal from the display device 100, and may transmit the signal to the external device 1000. That is, the redistribution wiring structure 400 may electrically connect the display device 100 and the external device 1000, and may transmit signals in both directions.

The first driving signal structure 200 may include the first penetration electrode 210, a driver IC chip 220, the first bump 231, and the second bump 232. According to some example embodiments, a passivation layer may be further formed outside the driver IC chip 220 in order to protect the driver IC chip 220.

The driver IC chip 220 may receive a first driving signal generated from the external device 1000 through the redistribution structure 400, and may apply the first driving signal to the pad PD. The pad PD may provide the first driving signal to the display panel 110. For example, the first driving signal may include various signals for driving the display device 100 such as data signals and control signals for controlling the data signals. That is, the first driving signal for driving the display device 100 may be generated from the external device 1000, and may be applied to the pad PD passing through the first driving signal structure 200 via the redistribution wiring structure 400.

The first penetration electrode 210 may vertically penetrate an inside of the first driving signal structure 200. For example, the first penetration electrode 210 may vertically penetrate the driver IC chip 220.

As the first penetration electrode 210 vertically penetrates the driver IC chip 220, the first penetration electrode 210 may be electrically connected to the redistribution wiring structure 400 and the pad PD. That is, the first penetration electrode 210 may transmit signals in both directions between the redistribution wiring structure 400 and the pad PD.

Because the first driving signal structure 200 includes the first penetration electrode 210, even when the second driving signal structure 300 and the redistribution structure 400 are vertically stacked on the first driving signal structure 200, the second driving signal structure 300 may provide a signal to the pad PD. In addition, by using the first penetration electrode 210 instead of a separate wire, the display device 100 may reduce the delay of the signal transmission time and the loss of the signals by the separate wire.

According to some example embodiments, the driver IC chip 220 may be formed on a silicon substrate, and the first penetration electrode 210 may be a through-silicon-via ("TSV") vertically penetrating an inside of the silicon substrate. In addition, in some example embodiments, the first penetration electrode 210 may include first to third layers extending from an outer wall to an inside of the first penetration electrode 210. In other words, the first layer located in the outer wall may surround the second layer, and the second layer may surround the third layer located in the inside of the first penetration electrode 210. The first layer may include a silicon oxide, the second layer may include a titanium nitride (TiN) or a tantalum nitride (TaN), and the third layer may include a copper (Cu).

The first penetration electrode 210 may be formed using any suitable manufacturing process. For example, a process of forming the first penetration electrode 210 may include an etching process for penetrating the driver IC chip 220 and a deposition process for forming the first to third layer. In addition, a process of forming the first driving signal structure 220 including the first penetration electrode 210 may be classified into via-first, via-middle, and via-last depending on when the first penetration electrode 210 is formed.

The first bump 231 may be located in an area where the first penetration electrode 210 is exposed between the first penetration electrode 210 and the redistribution wiring structure 400. The first bump 231 may be connected to the redistribution wiring structure 400.

The second bump 232 may be located in the area where the first penetration electrode 210 is exposed between the first penetration electrode 210 and the pad PD. The second bump 232 may be connected to the pad PD.

The first and second bumps 231 and 232 may include a conductive metal material, and may be electrically connected to each other through the first penetration electrode 210. That is, a signal may be transmitted to the first driving signal structure 200 through the first bump 231, or may be applied to the pad PD through the second bump 232 after the signal is transmitted to the first penetration electrode 210 through the first bump 231.

The second driving signal structure 300 may be formed together with the circuit layer 410 of the redistribution wiring structure 400, and may be located on a same layer as the circuit layer 410. For example, the second driving signal structure 300 and the circuit layer 410 may be formed through the PLP process.

The second driving signal structure 300 may receive a second driving signal and the sensing signal, which are generated from the external device 1000, through the redistribution wiring structure 400. In addition, the second driving signal structure 300 may apply the second driving signal and the sensing signal to the pad PD. The pad PD may provide the second driving signal to the display panel 110, and may provide the sensing signal to the sensing structure 130. The second driving signal and the sensing signal may include various signals for driving the display device 100.

According to some example embodiments, the second driving signal structure 300 may include a power management integrated circuit ("PMIC") that suitably converts, distributes, and controls a power used in the display device 100. In this case, the second driving signal may be the power for driving the first driving signal structure 200 and the display panel 110. The second driving signal structure 300 may provide the second driving signal (for example, the power) to the first driving signal structure 200 and the display panel 110. That is, the second driving signal for driving the first driving signal structure 200 and the display panel 110 may be generated from the external device 1000, and may be transmitted to the second driving signal structure 300 through the redistribution wiring structure 400. The second driving signal may be applied to the first driving signal structure 200 and the pad PD.

According to some example embodiments, the second driving signal structure 300 may include a sensing control chip (e.g., a touch IC chip) that controls the display device 100 by sensing the touch or the approach of the user. In this case, the sensing signal may detect the changed capacitance generated between the sensing electrodes included in the sensing structure 130. The second driving signal structure 300 may provide the sensing signal to the sensing structure 130 and/or the display panel 110. For example, the sensing signal may be generated from the external device 1000, and may be transmitted to the second driving signal structure 300 through the redistribution wiring structure 400. In addition, the sensing signal may be provided to the sensing structure 130 passing through the redistribution wiring structure 400, the first penetration electrode 210 and the pad PD from the second driving signal structure 300. Subsequently, the sensing signal provided to the sensing structure 130 may be transmitted to the first driving signal structure 200 through the pad PD again, and may be transmitted to the second driving signal structure 300 and the redistribution wiring structure 400 through the pad PD and the first penetration electrode 210.

Meanwhile, the complex circuit package 120 may be a structure in which the first driving signal structure 200 and the redistribution wiring structure 400 are vertically stacked. In a process for forming the complex circuit structure 120 on the pad PD, the redistribution wiring structure may be located on the first driving signal structure 200, after the first driving signal structure 200 is located on the pad PD. However, an order of the process for forming the complex circuit structure 120 on the pad PD is not limited thereto.

The complex circuit package 120 may further include an adhesion member 600 located between the first bump 231 and the redistribution wiring structure 400. In this case, the adhesion member 600 may be an anisotropic conducting film. The anisotropic conducting film may include an adhesive cured by heat and conductive particles. When a pressure is applied to the anisotropic conductive film, the adhesive may be spread so that the conductive particles are exposed to a surface of the anisotropic conductive film. Therefore, the anisotropic conductive film may have both a conductivity and an adhesiveness. In an example embodiment, the first driving signal structure 200 and the redistribution structure 400 may be attached to each other by applying a pressure and a heat by a compression bonding device. In another example embodiment, the first driving signal structure 200 and the redistribution wiring structure 400 may be attached to each other by applying an appropriate pressure and an ultrasonic vibration by the ultrasonic bonding device.

Meanwhile, the complex circuit package 120, which transmits the first driving signal to the first driving signal structure 200 and transmits the second driving signal to the second driving signal structure 300, has been described in the above, but the complex circuit package 120 is not limited thereto. For example, the second driving signal structure may include the first penetration electrode, and may be located on the pad PD. In addition, the first driving signal structure may be formed together with the circuit layer 410, and may be located on the second driving signal structure located on the pad PD. In this case, the first driving signal may be transmitted to the second driving signal structure, and the second driving signal may be transmitted to the first driving signal structure.

Figure 5:
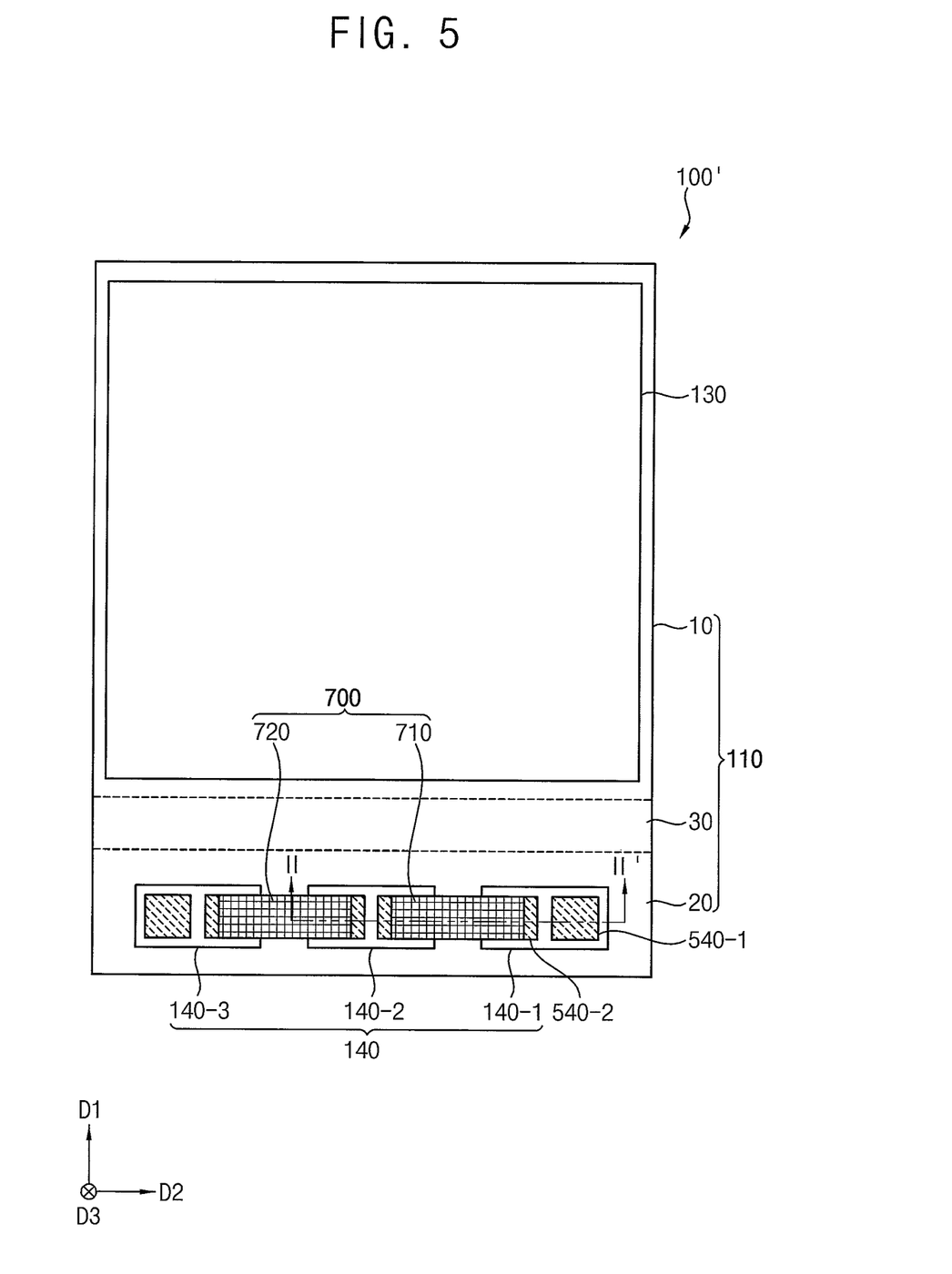
FIG. 5 is a plan view illustrating a display device according to some example embodiments.
Figure 6:
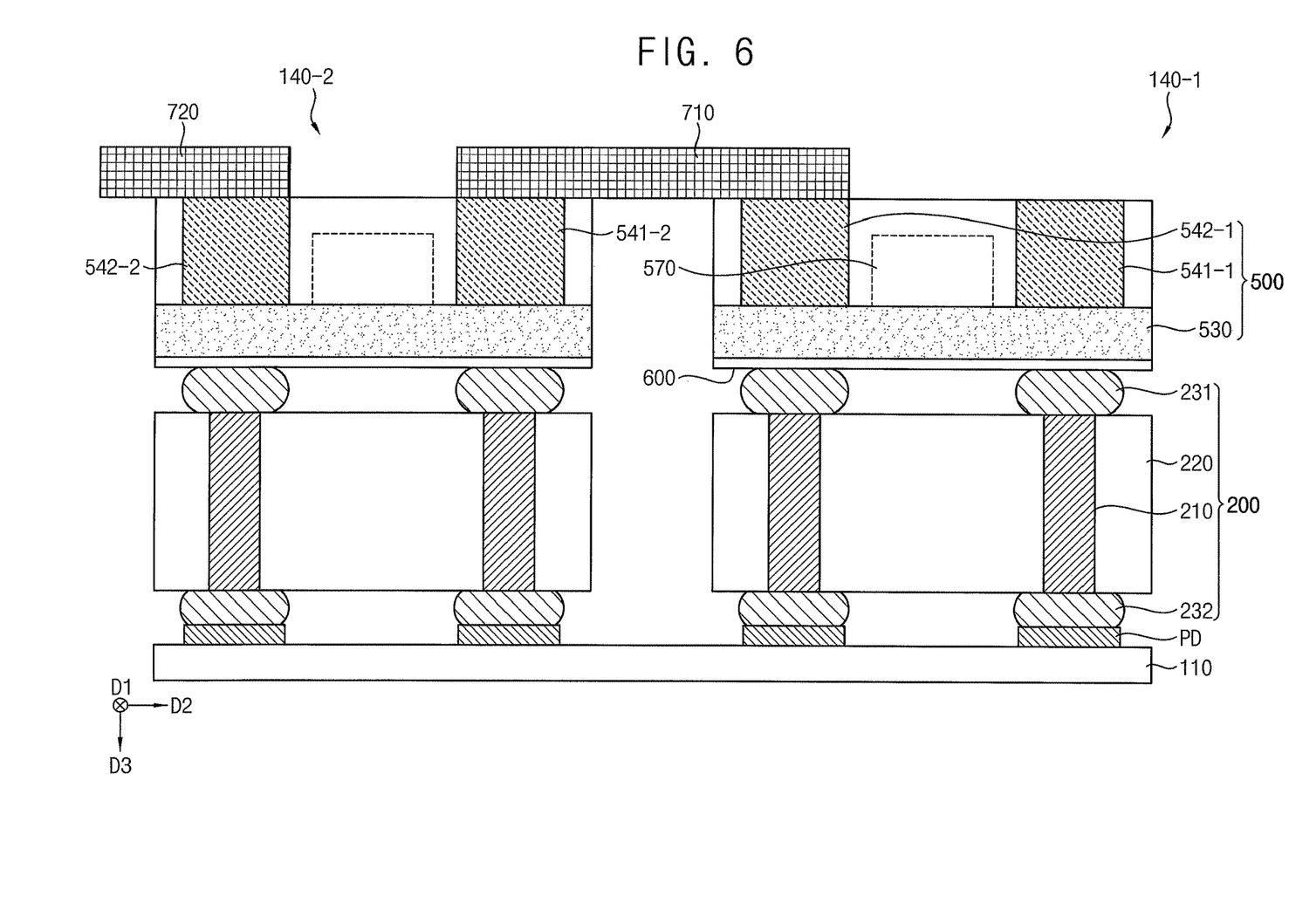
FIG. 6 is a cross-sectional view taken along the line II-II' of FIG. 5.

FIG. 5 is a plan view illustrating a display device according to some example embodiments, and FIG. 6 is a cross-sectional view taken along the line II-II' of FIG. 5.

Referring to FIGS. 5 and 6, the display device 100' may include a display panel 110, a sensing structure 130, a plurality of complex circuit packages 140, and a plurality of conductive films 700. However, because the display panel 110 and the sensing structure 130 of the display device 100' are substantially the same as the display panel 110 and the sensing structure 130 of the display device 100, hereinafter, the complex circuit packages 140 and the conductive films 700 will be described in more detail.

The complex circuit packages 140 may be located on the pad area 20 of the display panel 110. For example, the complex circuit packages 140 may be located on the pad PD in the pad area 20, and may be electrically connected to the pad PD. According to some example embodiments, the complex circuit packages 140 may be located in a row along the second direction D2. For example, the complex circuit packages 140 may include first to third complex circuit packages 140-1, 140-2, and 140-3, and the first to third complex circuit packages 140-1, 140-2, and 140-3 may be arranged at regular intervals along an opposite direction of the second direction D2.

Meanwhile, although the complex circuit packages 140 is illustrated as being located in a lower portion of the display panel 110 in FIG. 5, a configuration of the present invention is not limited thereto. For example, the pad area 20 may be located on upper and lower portions of the display panel 110, or may be located in corner portions of the display panel 110. In this case, the complex circuit packages 140 may be located in the upper and lower portions of the display panel 110, or may be located on the corner portions of the display panel 110.

The display device 100' may be a small electronic device, or a medium/large electronic device. In general, when the display device 100' is a relatively small electronic device, one complex circuit package may be utilized. Otherwise, when the display device 100' is a relatively medium or large electronic device, the plurality of complex circuit packages may be utilized. However, a configuration of embodiments according to the present invention is not limited thereto. Although three complex circuit packages 140-1, 140-2, and 140-3 are illustrated in FIG. 5, one complex circuit package or a plurality of complex circuit packages may be utilized as necessary.

Each of the complex circuit packages 140 may include a first driving signal structure 200 and a redistribution wiring structure 500.

Driving signal structures, components, or circuits (e.g., display driver IC chips) for driving display panel and a flexible printed circuit board ("FPCB") may be utilized in a display device. In this case, the FPCB may have a curved shape such that the FPCB is bent in order to electrically connect the external device 1000 and the driving signal structures. In addition, the FPCB may have a length corresponding to an entire length of all the driving signal structures. The bent portion of the FPCB may be defined as a dead space. In addition, signals generated from the external device are applied to the driving signal structures through the FPCB, such that signal transmission time of the display device may be delayed.

On the other hand, the display device 100' may include the complex circuit packages 140 in which the redistribution structure 500 is vertically stacked on the first driving signal structure 200, so that use of an extra FPCB may be avoided.

Accordingly, the dead space of the display device 100' may be reduced, and the signal transmission time may be shortened.

In this case, each of the complex circuit packages 140 may have a vertically (for example, in a direction opposite to the third direction D3) stacked structure. In other words, the first driving signal structure 200 may be arranged on the pad PD in the pad area 20, and the redistribution wiring structure 500 may be located on the first driving signal structure 200.

In addition, as each of the complex circuit packages 140 has the vertically stacked structure, each of the complex circuit packages 140 may electrically connect the display device 100' and the external device 1000. For example, each of the complex circuit packages 140 may electrically connect the display device 100' and the external device 1000, using a first penetration electrode 210 and bumps 231 and 232 included in the first driving signal structure 200, and the redistribution wiring structure 500. However, because the first driving signal structure 200 of the display device 100' is substantially the same as the first driving signal structure 200 of the display device 100, hereinafter, the redistribution wiring structure 500 will be described in more detail.

The redistribution wiring structure 500 may include a redistribution wiring layer 530, a first connector 541, and a second connector 542. The redistribution wiring layer 530 may be arranged between the first driving signal structure 200 and the conductive films 700, on the first driving signal structure 200. In addition, the redistribution wiring layer 530 may electrically connect the first driving signal structure 200 and the conductive films. The redistribution wiring layer 530 may receive a signal generated from the external device 1000, and may transmit the signal to the first driving signal structure 200 and the conductive films 700. According to some example embodiments, the redistribution wiring layer 530 may be formed in multiple layers in order to properly transmit the signal. For example, the redistribution wiring layer 530 may have a structure in which a metal layer with a wiring pattern and an insulating layer are alternately arranged.

The first connector 541 may receive a signal from an outside or external component our source, and may transmit the signal to the redistribution wiring layer 530. For example, the first connector 541-1 included in the first complex circuit structure 140-1 may receive the signal from the external device 1000, and may transmit the signal to the redistribution wiring layer 530. The first connector 541-2 included in the second complex circuit package 140-2 may receive the signal from the first conductive film 710, which is connected to the first connector 541-2, among the conductive films 700, and may transmit the signal to the redistribution wiring layer included in the second complex circuit package 140-2.

The second connector 542 may receive a signal from the redistribution wiring layer 530, and may transmit the signal to the outside. For example, the second connector 542-1 included in the first complex circuit structure 140-1 may receive the signal from the redistribution wiring layer 530, and may transmit the signal to the first conductive film 710, which is connected to the second connector 542-1, among the conductive films 700. The second connector 542-2 included in the second complex circuit package 140-2 may receive the signal from the redistribution wiring layer included the second complex circuit package 140-2, and may transmit the signal to the second conductive film 720 connected to the second connector 542-2.

Meanwhile, the first connector 541 may be arranged in a first portion on the redistribution wiring layer 530, and the second connector 542 may be arranged in a second portion on the redistribution wiring layer 530. The first portion and the second portion may be appropriately set as necessary. For example, as shown in FIGS. 5 and 6, the first portion may not overlap with the second portion. However, some or whole of the first portion may overlap with the second portion. In this case, some or whole of the first connector 541 may overlap with the second connector 542.

The conductive films 700 may electrically connect the complex circuit packages 140 to each other. According to some example embodiments, each of the conductive films 700 may electrically connect two adjacent complex circuit packages among the complex circuit packages 140. For example, the conductive films 700 may include the first and second conductive films 710 and 720. The first conductive film 710 may electrically connect the first and second complex circuit packages 140-1 and 140-2, and the second conductive film 720 may electrically connect the second and third complex circuit packages 140-2 and 140-3. For example, each of the conductive films 700 may be the FPCB, or may include a conductive material.

Meanwhile, although the first complex circuit package 140-1 located at the right end of the complex circuit packages 140 is illustrated as receiving a signal from the external device 1000 in FIG. 6, a configuration of embodiments according to the present invention is not limited thereto. For example, by changing a connecting structure of the complex circuit packages 140 and the conductive films 700, the second complex circuit package 140-2 located at a center of the complex circuit packages 140 may receive the signal from the external device 1000. Otherwise, the third complex circuit package 140-3 located at a left end of the complex circuit packages 140 may receive the signal from the external device 1000.

A display device including the driving signal structures (e.g., the display driver IC chips) may include an FPCB having a length corresponding to an entire length of all the driving signal structures in order to provide a signal to all driving signal structures. On the other hand, because the display device 100' includes the complex circuit packages 140 arranged on the first driving signal structures 200, and the conductive films 700 electrically connecting each of the complex circuit packages 140, the external device 1000 and all the first driving signal structures 200 may be electrically connected in a minimum area. In addition, because the first driving signal structure 200 simply transmits and reconstructs a signal, a signal loss during signal transmission may be reduce, and the signal transmission time may be shortened.

Aspects of some example embodiments of the present inventive concept may be applied to a display device and an electronic device using the display device. For example, example embodiments according to the present inventive concept may be applied to a cellular phone, a smart phone, a video phone, a smart pad, a smart watch, a tablet PC, a car navigation system, a television, a computer monitor, a laptop, etc.

The foregoing is illustrative of aspects of some example embodiments and is not to be construed as limiting thereof. Although a few example embodiments have been described, those skilled in the art will readily appreciate that many modifications are possible in the example embodiments without materially departing from the novel teachings and characteristics of the present inventive concept. Accordingly, all such modifications are intended to be included within the spirit and scope of embodiments according to the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the spirit and scope of the appended claims, and their equivalents.

What is claimed is:

1. A display device comprising:
a display panel including a display area and a pad area having a pad; and
a complex circuit package on the pad, including:
a first driving signal structure including a first penetration electrode vertically penetrating an inside of the first driving signal structure;
a second driving signal structure on the first driving signal structure; and
a redistribution wiring structure surrounding the second driving signal structure, and the redistribution wiring structure electrically connecting the first driving signal structure and the second driving signal structure.

2. The display device of claim 1, wherein the first driving signal structure further includes:
a first bump between the first penetration electrode and the redistribution wiring structure; and
a second bump between the first penetration electrode and the pad.

3. The display device of claim 2, wherein the first penetration electrode electrically connects the first bump and the second bump.

4. The display device of claim 2, further comprising:
an adhesion member between the first bump and the redistribution wiring structure.

5. The display device of claim 1, wherein the redistribution wiring structure further includes:
a circuit layer on a same layer as the second driving signal structure;
a first wiring layer between the circuit layer and the first driving signal structure;
a second wiring layer on the second driving signal structure and the circuit layer; and
a connector on the second wiring layer.

6. The display device of claim 5, wherein the redistribution wiring structure further includes:
a third wiring layer between the connector and the second wiring layer; and
a second penetration electrode between the second wiring layer and the third wiring layer, and the second penetration electrode vertically penetrating an inside of the redistribution wiring structure.

7. The display device of claim 1, wherein an external device is configured to generate a first driving signal and a second driving signal,
wherein the first driving signal is applied to the pad passing through the first driving signal structure via the redistribution wiring structure, and
wherein the second driving signal is applied to the pad passing through the second driving signal structure and the first penetration electrode via the redistribution wiring structure.

8. The display device of claim 1, further comprising:
a sensing structure on the display panel.

9. The display device of claim 8, wherein an external device is configured to generate a sensing signal, and
wherein the sensing signal is applied to the sensing structure passing through the second driving signal structure and the first penetration electrode via the redistribution wiring structure.

10. The display device of claim 1, wherein the display panel further includes a bending area, and
wherein the complex circuit package is on a rear surface of the display panel when the bending area is bent.

11. A display device comprising:
a display panel including a display area and a pad area having a pad;
a plurality of complex circuit packages on the pad of the display panel; and
a plurality of conductive films electrically connecting the plurality of complex circuit packages,
wherein each of the complex circuit packages includes:
a first driving signal structure including a first penetration electrode vertically penetrating an inside of the first driving signal structure; and
a redistribution wiring structure on the first driving signal structure, the redistribution wiring structure electrically connecting the first driving signal structure and the conductive films.

12. The display device of claim 11, wherein each of the conductive films electrically connects two adjacent complex circuit packages of the complex circuit packages.

13. The display device of claim 11, wherein the first driving signal structure further includes:
a first bump between the first penetration electrode and the redistribution wiring structure; and
a second bump between the first penetration electrode and the pad.

14. The display device of claim 13, wherein the first penetration electrode electrically connects the first bump and the second bump.

15. The display device of claim 13, further comprising:
an adhesion member between the first bump and the redistribution wiring structure.

16. The display device of claim 11, wherein the redistribution wiring structure further includes:
a redistribution wiring layer on the first driving signal structure;
a first connector in a first portion on the redistribution wiring layer, the first connector being configured to receive a signal, and the first connector being configured to transmit the signal to the redistribution wiring layer; and
a second connector in a second portion on the redistribution wiring layer, wherein the second connector is configured to receive the signal from the redistribution wiring layer.

17. The display device of claim 11, further comprising:
a sensing structure on the display panel.

18. The display device of claim 11, wherein the display panel further includes a bending area, and
wherein the complex circuit packages are on a rear surface of the display panel when the bending area is bent.

* * * * *